United States Patent [19]
Lin et al.

[11] Patent Number: 6,154,798
[45] Date of Patent: *Nov. 28, 2000

[54] COMPUTER SYSTEM IMPLEMENTING HOT DOCKING AND UNDOCKING CAPABILITIES BY EMPLOYING A LOCAL BUS ARBITER IDLE STATS IN WHICH THE ARBITER IS PARKED ON A FIRST INPUT/OUTPUT BUS PORTION

[75] Inventors: Richard S. Lin, Houston; David J. Maguire, Spring, both of Tex.; James R. Edwards, Longmont, Colo.; David J. Delisle, Spring, Tex.

[73] Assignee: Compaq Computer Corporation, Houston, Tex.

[*] Notice: This patent is subject to a terminal disclaimer.

[21] Appl. No.: 09/250,596

[22] Filed: Feb. 16, 1999

Related U.S. Application Data

[63] Continuation of application No. 08/684,255, Jul. 19, 1996, Pat. No. 5,873,000.

[51] Int. Cl.$^7$ ..................................................... G06F 13/12
[52] U.S. Cl. .............................. 710/72; 710/103; 710/119
[58] Field of Search ..................................... 710/103, 119, 710/131, 72, 62

[56] References Cited

U.S. PATENT DOCUMENTS

| | | | |
|---|---|---|---|
| 5,202,956 | 4/1993 | Ahn et al. ................................ | 395/325 |
| 5,323,291 | 6/1994 | Boyle et al. ............................. | 361/683 |
| 5,347,425 | 9/1994 | Herron et al. ........................... | 361/683 |
| 5,471,590 | 11/1995 | Melo et al. ............................. | 395/288 |
| 5,488,572 | 1/1996 | Belmont ................................. | 364/514 |

(List continued on next page.)

FOREIGN PATENT DOCUMENTS

| | | |
|---|---|---|
| 0496535A2 | 1/1992 | European Pat. Off. . |
| 0637793A1 | 7/1994 | European Pat. Off. . |

OTHER PUBLICATIONS

European Search Report, EP97305240, Dec. 10, 1998, 2 pp.
*Hot Docking, A New World of On–Demand, Powered–Up Desktop Connections*, Portable Design, Jul. 1996, pp. 25–26.
*Hang On! Here's Another Approach To Hot Docking*, Portable Design, Jul. 1996, pp. 19–20.
*Bus Switches Ease Connections 5V, 3.3V Devices; Quality Semiconductor Inc. Introduces Additions to QuickSwitch Family of CMOS Bus Switches*, Electronic News Publishing, vol. 40, No. 2029, Aug. 29, 1994, p. 48.

(List continued on next page.)

*Primary Examiner*—Thomas C. Lee
*Assistant Examiner*—Albert Wang
*Attorney, Agent, or Firm*—Akin, Gump, Strauss, Hauer & Feld, LLP

[57] ABSTRACT

A method for hot docking and hot undocking a portable computer and a docking station. The portable computer and docking station are physically coupled via a shared PCI bus and an expansion connector. Varying length pins in the expansion connector generate docking and undocking handshaking signals used by microcontrollers in the portable computer and docking station. The portable computer and docking station are functionally connected via low onresistance switches located in the portable computer. Following a docking event, closure of the switches connects the portion of the shared PCI bus in the docking station with the PCI bus in the portable computer. When the switches are open, the PCI busses are functionally isolated. Both the portable computer and the docking station also include a local arbiter for arbitrating and granting bus control requests from devices coupled to the shared PCI bus. These local arbiters may be placed into an idled state by either the operating system (through system BIOS) or by the microcontrollers. The arbiters are idled during docking and undocking events in order to inhibit bus cycles on the PCI bus, thereby preventing cycles from being lost. Following completion of a hot docking or undocking event, Plug-and-Play system reconfiguration is carried out so that all system resources may be recognized and properly utilized by the operating system.

10 Claims, 11 Drawing Sheets

U.S. PATENT DOCUMENTS

| | | | |
|---|---|---|---|
| 5,557,754 | 9/1996 | Sone et al. ............................... | 710/107 |
| 5,598,537 | 1/1997 | Swanstrom et al. ..................... | 395/281 |
| 5,598,539 | 1/1997 | Gephardt et al. ........................ | 395/281 |
| 5,621,899 | 4/1997 | Gafford et al. .......................... | 395/299 |
| 5,632,020 | 5/1997 | Gephardt et al. ........................ | 395/283 |
| 5,933,609 | 8/1999 | Walker et al. ........................... | 710/101 |

OTHER PUBLICATIONS

*Plug and Play BIOS Specification*, Version 1.0A, Compaq Computer Corp., Phoenix Technologies Ltd., Intel Corp., Mar. 10, 1994, pp 1–79.

*1991 Databook SRAM FIFO FCT Quickswitch™*, Quality Semiconductor, Inc., © 1991, pp. 5–23 through 5–27.

COMPUTER SYSTEM IMPLEMENTING HOT DOCKING AND UNDOCKING CAPABILITIES BY EMPLOYING A LOCAL BUS ARBITER IDLE STATS IN WHICH THE ARBITER IS PARKED ON A FIRST INPUT/ OUTPUT BUS PORTION

This application is continuation of Ser. No. 08/684,255, filed Jul. 19,1996, now U.S. Pat. No. 5,873,000.

BACKGROUND OF THE INVENTION

1. Field of the Invention

The present invention relates in general to a laptop computer and associated docking station, and more particularly to a method of hot docking and undocking without the need to place the computer system in a standby or suspended mode.

2. Description of the Related Art

Performance improvements in microprocessor and memory systems have resulted in computers so powerful that they are now capable of performing tasks that before could only be performed by large mainframe computers. Technological change has been especially swift in the area of portable computers, where power consumption efficiency is balanced against features, cost, size, weight and performance. Design choices are particularly challenging since many computer users desire the portable computer to provide functionality similar to that of a desktop unit. The term "portable computers" is used broadly to denote the class of computers powered by battery or solar power. Those familiar with portable computers will recognize other labels such as: luggable, laptop, notebook and hand-held. These categorizations are used to designate certain marketing segments of the larger portable computer market.

Many options are available to the computer system designer. While simply designing around the highest performance processor available goes a long way towards providing a high performance product, it is not enough in today's market. The processor must be supported by high performance components and a high performance I/O (input/ output) bus. Several standardized I/O buses are available to the system designer including: ISA (Industry Standard Architecture); EISA (Extended Industry Standard Architecture); and PCI (Peripheral Component Interface). Today's computers are typically designed with some combination of the three to provide the user with the performance of PCI and backward compatibility to ISA or EISA. These three buses are familiar to those skilled in the art.

Certain performance criteria also involve special features of the computer that distinguish one manufacturer's computer from a competitor's. These added features can result in increased size and weight. For example, software and multimedia documents can require large amounts of storage, and a very high capacity hard disk drive is often necessary. High capacity disk drives, however, are usually larger and heavier than is desirable for a portable computer. It is also desirable to have the ability to add functionality to the portable computer. Typical expansion bays, however, can also compromise a portable system's size advantages.

One known method of providing extra features without negatively impacting size and weight is through the use of an expansion base unit (also referred to as a docking station). An expansion unit is a non-portable unit that typically operates from AC power and resides on the user's desktop. When the user is working at the desk, the portable computer plugs into the expansion unit to provide added functionality. For example, the expansion unit may have a network interface unit for connecting to a local area network, a high capacity disk drive, a CRT, a full-size keyboard, a floppy or CD-ROM drive and other peripherals.

The connection between the portable computer and the expansion base unit is typically proprietary since no standard has yet evolved. One known way to couple the portable computer to the expansion base unit is through the existing I/O bus. In a portable computer having a PCI bus and an ISA bus, either bus might be used to connect to the expansion base unit. For highest performance, the PCI bus is preferable.

Current methods of connecting portable computers to docking stations are less than ideal. Using what is known as "cold docking," the user must close all applications and turn off power to the system prior to any undocking/docking actions. This type of docking requires a re-boot in order for the portable computer to recognize peripherals in the docking station. In addition, upgrading the docking station with new peripheral cards means that the user must possess enough technical savvy to understand interrupts and direct memory access (DMA) and be able to physically set configuration jumpers.

The new Plug-and-Play (PnP) standards have made docking and undocking somewhat easier. In systems incorporating "warm docking" capabilities, the portable computer must be placed in a "suspend" or "standby" state prior to docking/undocking. Entry into a standby state is normally accomplished by pushing a button or hot-key on the portable. In a typical standby state, the state of the system is stored in system memory, all devices are placed in a low power state if possible, with power being removed from the floppy drive, the hard drive and most ports. Bus clocks are also disabled, although a lower frequency clock remains active to maintain system memory. By utilizing Plug-and-Play features, the portable computer is able to recognize and activate peripherals when it exits the standby state and without the need to re-boot. The time spent in the standby state, however, is often longer than desirable.

In many docking systems, the portable computer is configured to automatically exit standby mode after a predetermined amount of time. This amount of time must be sufficient for completion of the motorized docking/ undocking action, as well as an additional safety margin. Additional time is therefore added to the docking/undocking process because of the requirement to go into standby mode. Currently, no efficient method exists for docking/undocking without first suspending or completely powering off the portable computer system.

SUMMARY OF THE INVENTION

Briefly, a portable computer and docking station according to the present invention incorporates hot docking/ undocking capabilities. Normal computer operations need not be suspended prior to the system reconfiguration following docking/undocking. The time and inconvenience required to dock or undock and reconfigure system components is substantially reduced over prior art systems. The portable computer and docking station are physically coupled via a shared PCI bus. An expansion connector is used to attach the portion of the PCI bus in the portable computer to the PCI bus in expansion base. Long, medium and short pins are provided in the expansion connector. All PCI bus signal lines are individually connected via medium length pins when the portable is docked. The short and long pins are used to inform microcontrollers in the portable computer and expansion base of the connection status of the medium length PCI bus signal pins during docking and undocking events.

During the docking process, for example, the long pins of the expansion connector are the first to connect and provide a signal to the microcontrollers indicating an impending docking event. The short pins function to inform the microcontrollers that the PCI bus signal pins have connected. In a similar manner, the short pins are the first to disconnect and provide a preliminary warning of an undocking event while the long pins indicate the completion of the undocking process.

The portable computer and docking station are functionally connected via low on-resistance switches located in the portable computer. Following a docking event, closure of the switches connects the portion of the shared PCI bus in the docking station with the PCI bus in the portable computer. When the switches are open, the PCI busses are functionally isolated. The switches are controlled by a signal generated by the microcontroller in the portable computer. During hot docking, the microcontroller verifies that power is enabled in the expansion base before the switches are closed.

In the preferred embodiment, the microcontroller in the portable computer is configured to generate a system management interrupt (SMI) prior to and following a change in the connection status of the long and short pins. The SMI notifies the basic input output system (BIOS) and the operating system that a docking/undocking event is occurring. Both the portable computer and the docking station also include a local arbiter for arbitrating and granting bus control requests from devices coupled to the shared PCI bus. These local arbiters may be placed into an idled state by either the operating system (through system BIOS) or by the microcontrollers. The arbiters are idled during docking and undocking events in order to inhibit bus cycles on the PCI bus, thereby preventing cycles from being lost.

The portable computer system of the disclosed embodiment also incorporates features complying with the Plug-and-Play standard. Following completion of a hot docking event, PCI Plug-and-Play and expansion bus Plug-and-Play system reconfiguration is carried out so that all system resources may be recognized and properly utilized by the operating system. Similarly, Plug-and-Play reconfiguration prevents the portable computer from recognizing components of the docking station following a hot undocking.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

The following disclosures are hereby incorporated by reference:

U.S. application Ser. No. 08/684,489 entitled "BUS SYSTEM FOR SHADOWING REGISTERS," by Dwight D. Riley and David J. Maguire, filed concurrently herewith;

U.S. application Ser. No. 08/684,412 entitled "CIRCUIT FOR HANDLING DISTRIBUTED ARBITRATION IN A COMPUTER SYSTEM HAVING MULTIPLE ARBITERS," by David J. Maguire, Dwight D. Riley and James R. Edwards, filed concurrently herewith;

U.S. application Ser. No. 08/684,485 entitled "LONG LATENCY INTERRUPT HANDLING AND INPUT/OUTPUT WHILE POSTING," by David J. Maguire and James R. Edwards, filed concurrently herewith;

U.S. pplication Ser. No. 09/073,135 entitled "SERIAL BUS SYSTEM FOR SHADOWING REGISTERS," by David J Maguire and Hung Q. Le, filed concurrently herewith;

U.S. application Ser. No. 08/684,584 entitled "APPARATUS AND METHOD FOR POSITIVELY AND SUBTRACTIVELY DECODING ADDRESSES ON A BUS," by Gregory N. Santos, James R. Edwards, Dwight D. Riley and David J. Maguire, filed concurrently herewith;

U.S. Pat. No. 5,781,748 entitled "TWO ISA BUS CONCEPT," by Gregory N. Santos, James R. Edwards, Dwight D. Riley and David J. Maguire, filed concurrently herewith; and U.S. Pat. No. 5,761,460 entitled "RECONFIGURABLE DUAL MASTER IDE INTERFACE," by Gregory N. Santos, David J. Maguire, William C. Hallowell and James R. Edwards, filed concurrently herewith; all of which are assigned to the assignee of this invention.

Figure 1:
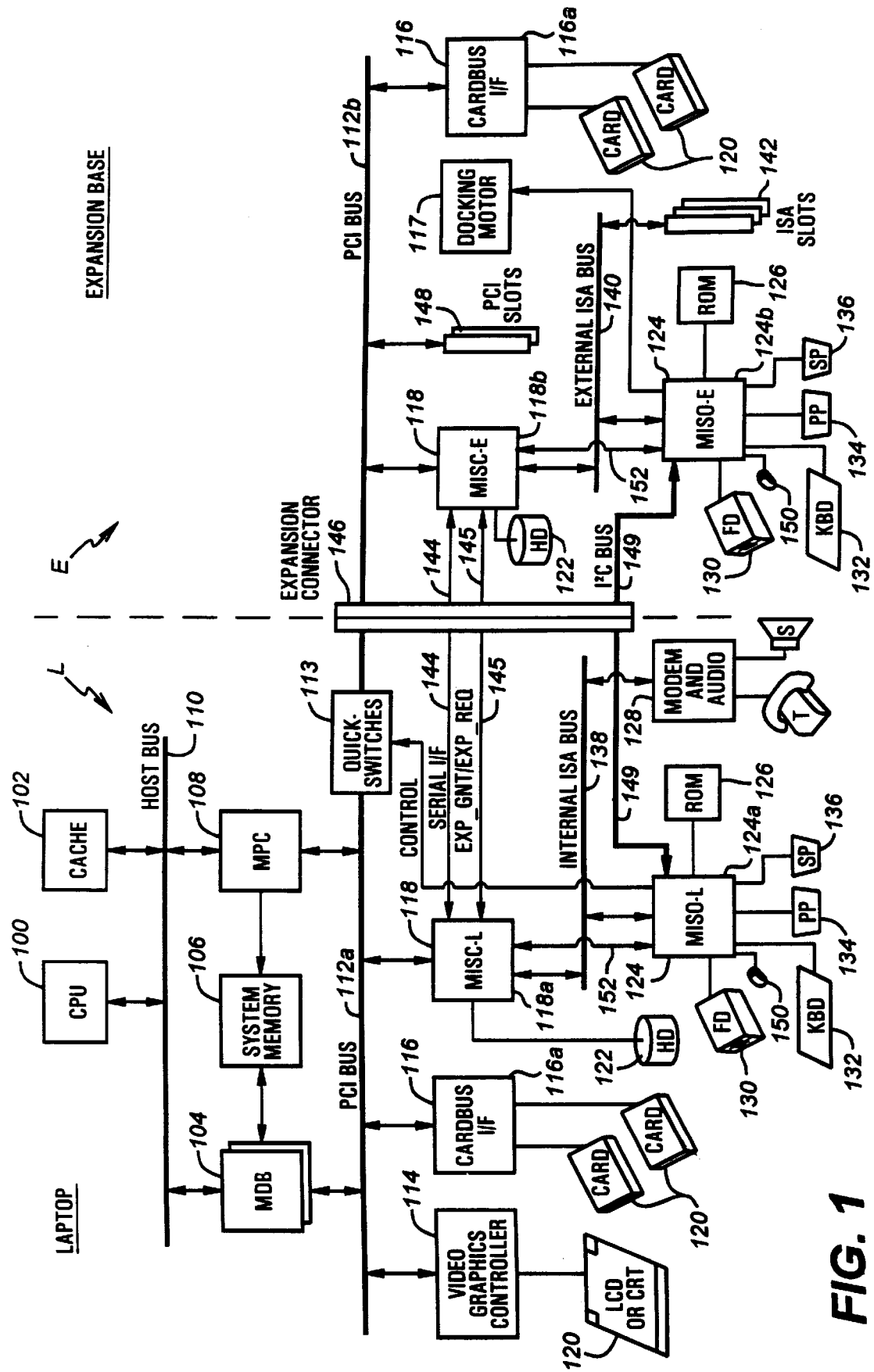
FIG. 1 is a block diagram of an exemplary computer system including hot docking and undocking capabilities according to the present invention.

Turning now to the drawings, FIG. 1 provides a block diagram of a computer system utilizing the present invention. The computer system is shown divided into a laptop portion L (hereinafter laptop computer L) and a docking station/expansion base unit portion E (hereinafter expansion base E). The laptop computer L is an operationally autonomous apparatus which is detachable from the expansion base E for remote computing operations. While the laptop computer L is docked into the expansion base E, the laptop computer L operates on AC power. When computer L is detached from the expansion base E, the laptop computer L operates from battery power. Mechanisms are also provided to operate the laptop computer from AC power while removed from the expansion base E. The expansion base E typically provides expandability for functions not included in the laptop portion L due to space or power concerns.

A Central Processing Unit (CPU) 100 is provided in the laptop computer L which is a conventional microprocessor such as the Pentium™ from Intel Corporation or a similar processor. The CPU 100 couples to a host bus 110 for communicating with system logic such as a cache memory 102, a Mobile Peripheral Component interconnect bus cache controller (MPC) 108 and pair of Mobile Data Buffers (MDB) 104. The cache memory 102 is a conventional cache memory for the CPU 100 and preferably employs high speed synchronous burst static Random Access Memory (RAM). The MPC 108 provides an interface to the cache memory 102, and includes tag RAMs and other logic for creating various cache ways, size, and speed configurations of the cache memory 102.

The MPC 108 and the MDB 104 are also coupled to a system memory 106 and a peripheral component interconnect (PCI) bus 112. The MPC 108 provides address and control to system memory 106, which is comprised of up to 256 MByte of conventional dynamic random access memories (DRAMs). The MDB 104 provides a 64-bit data path between the host bus 110 and the system memory 106 and provides a 32-bit data path to the PCI bus 112. The MPC 108 and MDB 104 have three major functional interfaces: a processor/cache interface, a system memory interface, and a PCI bus interface. The MDB 104 is responsible for buffering data between the three interfaces while the MPC 108 is responsible for handling addressing, command and control. Each of these interfaces operate independently from the other and includes queues for read and write posting between any two of the three interfaces. The processor/cache interface allows the CPU 100 to pipeline cycles into read cycles and allows snoop accesses to the tag RAM to occur while the pipeline cycles are executing. The memory interface controls the system memory 106 and generates control signals to the MDB 104. The interface also allows read ahead operations for those PCI masters issuing a read multiple command. The PCI interface allows MPC 108 to act as a PCI master when the CPU 100 is accessing the PCI bus 112, or as a PCI slave when a PCI device accesses system memory 106.

The PCI bus was designed to have a high throughput and to take advantage of an increasing number of local processors supporting I/O functions. For example, most disk controllers, particularly Small Computer System Interface (SCSI) controllers, and network interface cards (NICs) include a local processor to relieve demands on the host processor. Similarly, video graphics boards often include intelligent graphics accelerators to allow higher level function transfer. Typically these devices incorporate the capability to act as bus masters, allowing them to transfer data at the highest possible rates. As mentioned, potential bus masters include the CPU/main memory subsystem (via MPC 108).

The PCI bus 112 provides a communications conduit between the laptop computer L and the expansion base E. A portion 112a of the PCI bus 112 resides in the laptop computer L and includes a Quickswitch 113 for each signal of the PCI bus 112. In the preferred embodiment, the Quickswitches 113 are low loss series in-line MOSFET devices with the gate (control line) driven by a control signal CONTROL from MSIO-L 124. The Quickswitch 113 can thereby be used to facilitate hot plug capabilities. When the laptop computer L is docked into the expansion base E and the Quickswitches 113 are turned on, a portion 112b of the PCI bus 112 in the expansion base E is coupled to the portion 112a via the expansion connector 146 to provide the extended PCI bus 112. Details of the expansion connector 146 and associated docking/undocking logic are provided in FIG. 2.

In the laptop computer L, the PCI bus 112a further couples to a video graphics controller 114, a Cardbus interface 116 (particularly 116a) and a Mobile Integrated System Controller Laptop 118 (particularly MISC-L 118a). In the expansion base E, the PCI bus 112b further couples to a second MISC 118 (MISC-E 118b), two PCI slots 148, and a second Cardbus interface 116 (particularly 116b). The video graphics controller 114 further couples to a low power liquid crystal display (LCD) 120 or alternatively a cathode ray tube (CRT) or any other style monitor. The Cardbus interface 116 is provided for communicating with add-on cards 120 such as networking cards, modem cards, solid state storage cards and rotating storage cards preferably of a Personal Computer Memory Card International Association (PCMCIA) style. The MISC 118 provides an interface for an Industry Standard Architecture (ISA) bus 138 or 140, and an integrated drive electronics (IDE) hard drive interface for communicating with hard drives 122. The MISC 118 is configurable based on an input pin (LAP_EXT_) for use in both the laptop computer L, as MISC-L 118a, and expansion base E, as MISC-E 118b. Thus, two MISC devices, 118a and 118b are coupled to the PCI bus 112, with MISC-L 118a coupled to the PCI bus portion 112a and MISC-E 118b coupled to PCI bus portion 112b. MISC-L 118a is further coupled to the internal ISA bus 138 while MISC-E 118b is coupled to the external ISA bus 140. The ISA bus 140 is well known to those skilled in the art.

The general functioning of MISC-L 118a and MISC-E 118b is very similar, and portions of their functionality are discussed together for sake of simplicity. The MISC 118 bridges the PCI bus 112 to the ISA bus 138 or 140 and acts as both a master and slave on the PCI bus 112 and a bus controller on the ISA buses 138 or 140. Of particular interest, the MISC 118 further includes bus arbitration circuitry, including a local PCI bus arbiter, an ISA bus arbiter, and a top level arbiter 192 (FIG. 2) that is used to arbitrate bus access between MISC-L 118a and MISC-E 118b when the laptop L is docked. The top level arbiter 192 is only active in the MISC-L 118a when the laptop is docked. MISC 118 is the means by which an enhanced direct memory access (EDMA) controller and ISA bus masters can gain access to the PCI bus 112.

In the preferred embodiment of the invention, the MISC 118 also incorporates 8237 compatible direct memory access (DMA) controllers, an enhanced DMA controller for fast IDE hard drives, 8254 compatible timers, an 8259 compatible interrupt controller, hot docking support logic, system power management logic, and Plug-and-Play support (not all shown in FIG. 1). Some components are disabled upon initialization by software to prevent conflicts or duplication. The MISC 118 also includes a serial interrupt interface 144 for serially passing interrupts from the MISC-E 118b to the MISC-L 118a. The serial interrupt interface 144 provides an interrupt architecture for supporting standard ISA interrupts in a PCI based system. An expansion base PCI request signal EXP_REQ and an expansion base PCI grant signal EXP_GNT are also passed between MISC-E 118b and MISC-L 118a. The MISC-E 118b uses the EXP_REQ and EXP_GNT signals to request and receive control of the PCI bus 112. These two signals are communicated over a serial bus 145.

The MISC 118 and the ISA buses 138 and 140 provide support for standard ISA peripherals such as those combined in a Mobile Super Input/Output (MSIO) 124 peripheral. The MSIO 124 peripheral has a combination of standard ISA peripherals, such as: a 146818 compatible real time clock (RTC), a floppy controller for interfacing to standard floppy drives 130; an 8051 compatible microcontroller 172 (FIG. 2) for communicating with a standard keyboard 132 and pointing device 150, for performing scanning and key code conversions on the keyboard 132, and for performing power management and hot docking functions; a universal asynchronous receiver transmitter (UART) for providing standard serial ports 136; and parallel port logic for a parallel port 134. The MSIO 124b is also capable of controlling a variable speed docking motor 117 included within the expansion base E. (Although shown connected to the MSIO 124b, the keyboard 132 and pointing device 150 can be, and preferrably are, instead passed directly accross the connector 146.) A read only memory (ROM) 126 couples to the MSIO 124 for providing code to the 8051 microcontroller 172. Additionally, the ROM 126 provides basic input/output services (BIOS) code to the CPU 100, which is copied from the ROM 126 and shadowed in system memory 106 upon system initialization so that thereafter the 8051 microcontroller 172 may access the ROM 126. A 1 bit MSIO Serial Bus (MSB) 152 is provided for shadowing registers containing information relating to power management and hot docking. Ideally, the bus is designed to be extensible and very low latency.

When the laptop L is docked, the MSIO-L 124a, MSIO 124b and other system components (not shown) are further coupled by an a standard I$^2$C-bus 149. The inter-integrated circuit or I$^2$C-bus 149 is a simple bidirectional two wire bus used to provide efficient control and identification functions between integrated circuitry. Details of the I$^2$C-bus can be found in the "The I$^2$C-Bus and How to Use It (Including Specification)," published by Phillips Semiconductors, January 1992. Briefly, the I$^2$C-bus 149 consists of two lines: a serial clock line (SCL) and a serial data line (SDA). Each of these lines is bidirectional. The SCL line provides the clock signal for data transfers which occur over the I$^2$C-bus. The SDA line is the data line for data transfers which occur over the I$^2$C-bus. Each device connected to the I$^2$C-bus is recognized by a unique address. Low value series resistors (not shown) are typically provided at each device connection for protection against high-voltage spikes.

In the laptop computer L, a modem and audio peripheral 128 is also provided and coupled to the ISA bus 138. The modem and audio peripheral 128 includes a standard telephony communications port for coupling to a telephone T, and an interface for coupling to a pair of stereo speakers S. In the expansion base E, three ISA expansion slots 142 are provided for standard ISA cards.

FIG. 1 presents an exemplary computer system L and E. In view of this disclosure, it is understood that other effective embodiments using somewhat different component arrangements could readily be developed by one skilled in the art.

Figure 2:
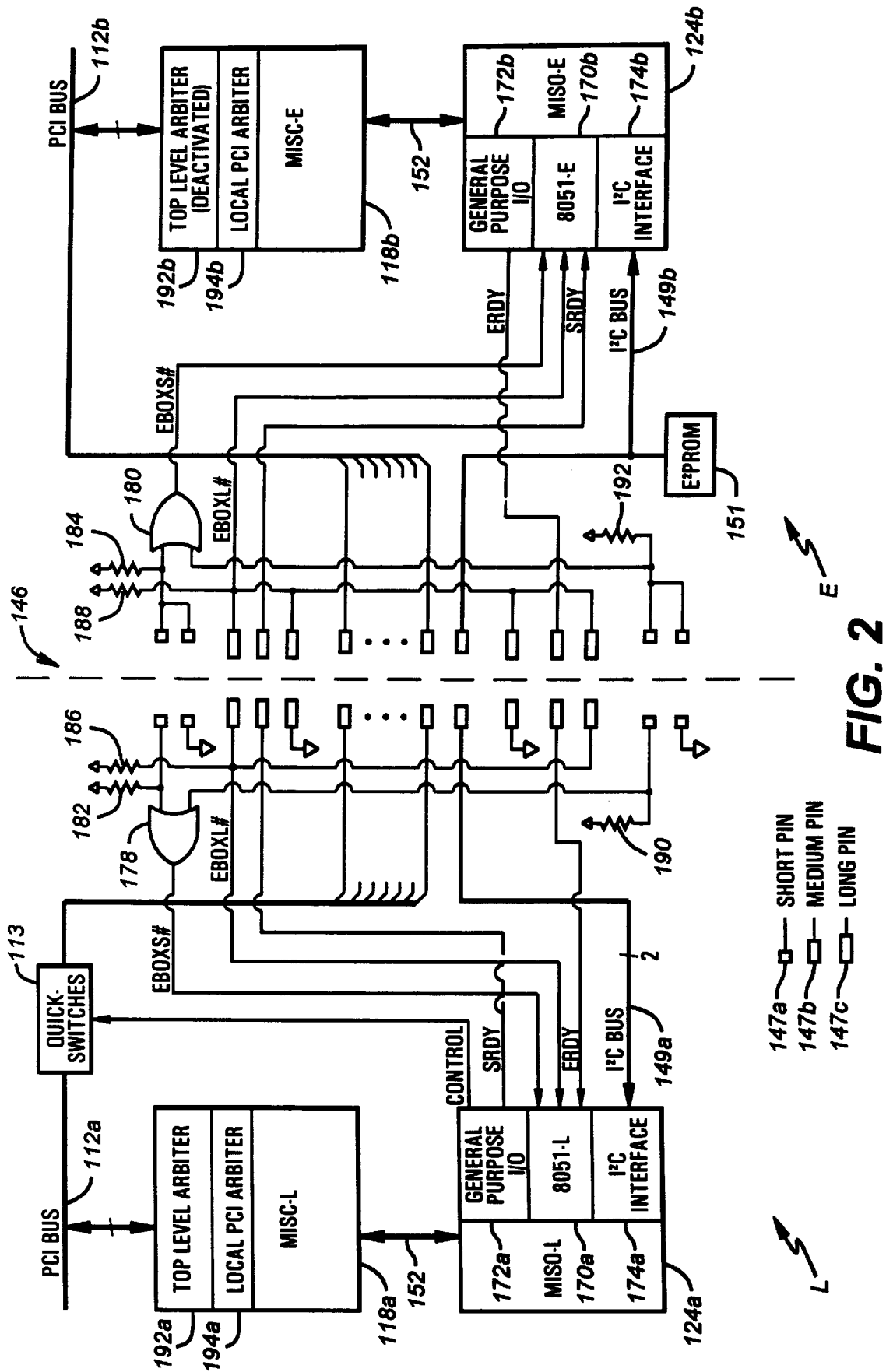
FIG. 2 is a more detailed block diagram of portions of the computer system of FIG. 1.

A more detailed schematic diagram of portions of the hot docking circuitry is provided in FIG. 2. The circuitry that is shown functions to coordinate communications between the laptop computer L and the expansion base E such that the operating system may recognize a docking event and idle the PCI bus 112 prior to docking.

The physical interface between the laptop computer L and the expansion base E consists of an expansion connector 146 that is comprised of short pins 147a, medium pins 147b, and long pins 147c. The connection is graphically represented by opposing "male" pins of matching lengths, although the actual implementation includes "female" receptor pins/slots on one side (preferably the laptop computer L side). The short and long pins 147a and 147c are used to generate various signals that are indicative of docking/undocking events.

A pair of two-input OR gates 178 and 180 are utilized to generate a short pin connect signal EBOXS# that is indicative of the connection status of the short pins 147a. A "#" sign is used in this specification to denote an active low signal. In the disclosed embodiment, the signal EBOXS# is driven by the outputs of these OR gates 178 and 180, and transitions to a logic low level when all of the short pins 147a at the inputs of the OR gates 178 and 180 have connected. The output of a first OR gate 178 in the laptop computer L is used to interrupt the 8051 microcontroller 170a of the MSIO-L 124a. One input of this OR gate 178 is connected to a short pin 147a on one end of the expansion connector 146, while the second input is connected to a short pin 147a on the opposite end of the expansion connector 146. Placing the short pin pairs on opposite ends of the expansion connector 146 aids in accounting for situations in which the laptop computer L is docked or undocked in a slightly sideways or torqued manner. In such a case, the pins may not be uniformly coupled/decoupled. Having short pins 147a on only one end of the expansion connector 146 may therefore provide an inaccurate indication of the connection status of the other pins.

A pair of pull-up resistors 182 and 190 are individually connected to the inputs of the OR gate 178. Thus, when the short pin 147a at either input is disconnected from its opposing short pin 147a in the expansion base E, that input is pulled to a logic high level by its associated pull-up resistor.

An OR gate 180 in the expansion base E is similarly configured to generate and interrupt to the 8051 microcontroller 170b in the MSIO-E 124b. A first input to this OR gate 80 is connected to a short pin 147a on one end of the expansion connector 146, while the second input is connected to a short pin 147a on the opposite end of the expansion connector 146. Pull-up resistors 184 and 192 are used to independently pull the inputs of the OR gate 180 to a logic high level when the short pins 147a are disconnected.

A second set of opposing short pins 147a is provided on either end of the expansion connector 146. In the laptop computer L, these pins are connected directly to the ground plane. On the expansion base E side, a second short pin 147a on either side of the expansion connector 146 is connected to its neighboring short pin 147a (the OR gate inputs). In this manner, when the short pins 147a on both sides of the expansion unit are connected, each input of the OR gates 178 and 180 is pulled to ground. The signal EBOXS# in both the expansion base E and laptop computer L thereby transitions to a logic low level. This configuration insures that the 8051 microcontrollers 170a and 170b are interrupted only after the short pins 147a on both ends of the expansion connector 146 are connected/disconnected.

During the docking process, the short pins 147a are used to inform the laptop computer L and expansion base E that all pins, including the long and medium length pins 147c and 147b, of the expansion connector 146 are connected. During the undocking process, the short pins 147a are used to signal the 8051 microcontrollers 170a and 170b of an impending undocking event. The warning signal is used to quiet the PCI busses 112a and 112b before the Quickswitches 113 are opened, thereby preventing PCI cycles from being lost during the undocking process.

In a similar manner, the long pins 147c of the expansion connector 146 are used to provide a preliminary warning of a docking event and to indicate the completion of an undocking event. More specifically, a long pin connect signal EBOXL# is provided to the 8051 microcontrollers 170a and 170b. A first pull-up resistor 186 is connected to the signal line for the signal EBOXL# on the laptop computer L side while a second pull-up resistor 188 is connected to the signal line for the signal EBOXL# on the expansion base E side. Thus, the signal EBOXL# is pulled to a logic high level on both sides when the long pins 147c are disconnected. On each end of the expansion connector 146, an opposing pair of long pins 147c are used to pull the signal EBOXL# to a logic low level following a successful connection. On the laptop computer L side, one of the long pins 147c of each pair is connected to the signal line for the signal EBOXL# while the second long pin 147c is connected to the ground plane. On the expansion base E side, both long pins 147c of each pair are connected to the signal line for the EBOXL# signal such that connection of the long pins 147c shorts the signal line to the ground plane in the laptop computer L.

Another pair of opposing long pins 147c is used to connect a signal line that provides a system ready signal SRDY from General Purpose I/O circuitry 172a of the MSIO-L 124a to the 8051 microcontroller 170b of the MSIO-E 124b. Yet another pair of opposing long pins 147c is used to connect a signal line providing an expansion base ready signal ERDY from General Purpose I/O circuitry 172b of the MSIO-E 124b to the 8051 microcontroller 170a of the MSIO-L 124a. The signals ERDY and SRDY are used for dual purposes; namely, for handshaking to close the Quickswitches 113 during docking and for handshaking between different components connected to the I$^2$C bus 149. These signals are discussed more fully in conjunction with FIGS. 3 and 4.

As shown in FIG. 2, medium length pins 147b are used to connect the individual signal lines of the two portions 112a and 112b of the PCI bus. When the medium length pins 147b are connected and the Quickswitches 113 are closed, the PCI bus 112 is physically and operatively unified. For sake of clarity, only a few of the individual signal line connections to the PCI bus 112 are shown.

Medium length pins 147b are also used to connect the I$^2$C bus 149a of the laptop computer L to the I$^2$C bus 149b of the expansion base E. Both MSIO-L 124a and MSIO-E 144b incorporate an I$^2$C interface 174a and 174b capable of serving as either a master or slave on the I$^2$C bus 149. Also connected to the I$^2$C bus 149b is an Electrically Erasable Programmable Read Only Memory (EEPROM) 151 that is used to provide identification information concerning the expansion base E. This information can be read by system components of the laptop computer L in order for it to ascertain the intelligence of the expansion base E and establish the proper handshaking protocol. In the preferred embodiment, the EEPROM memory 151 is powered by the laptop computer L. In this manner, data concerning the expansion base E can be retrieved regardless of the its power condition. Using the I$^2$C bus 149 to coordinate communications between the 8051 microcontrollers 170a and 170b provides a flexible and intelligent communication channel.

As mentioned above, both the MISC-L 118a and the MISC-E 118b contain a top level arbiter 192a and 192b. When the laptop computer L is docked, the top level arbiter 192a of the MISC-L 118a provides top level arbitration functions for the entire system while the top level arbiter 192b of the MISC-E 118b is deactivated. Details of this arbitration scheme are provided in the previously incorporated U.S. Patent Application entitled, "CIRCUIT FOR HANDLING DISTRIBUTED ARBITRATION IN A COMPUTER SYSTEM HAVING MULTIPLE ARBITERS."

The top level arbiter 192a essentially controls whether the local PCI arbiter 194a of the MISC-L 118a or the local PCI arbiter 194b of the MISC-E 118b has access to the PCI bus 112. Either local PCI arbiter 194a or 194b must receive a grant from the top level arbiter before it runs a cycle. Grants for the PCI bus 112 are based mainly on a time multiplexed basis. When the laptop computer L is not docked, the top level arbiter 192a always grants bus access to the laptop local PCI arbiter 194a. The laptop PCI arbiter 194a requests bus access using a laptop request signal (not shown) to the top level arbiter 192a, and is granted bus access by the top level arbiter 192a using a laptop grant signal. These signals are self-contained within the laptop computer L. The expansion base PCI arbiter 194b similarly sends and receives expansion request and grant signals EXP_GNT\EXP_REQ (FIG. 1), which are communicated between the laptop computer L and the expansion base E via medium length pins 147b in the expansion connector 146.

Figure 3:
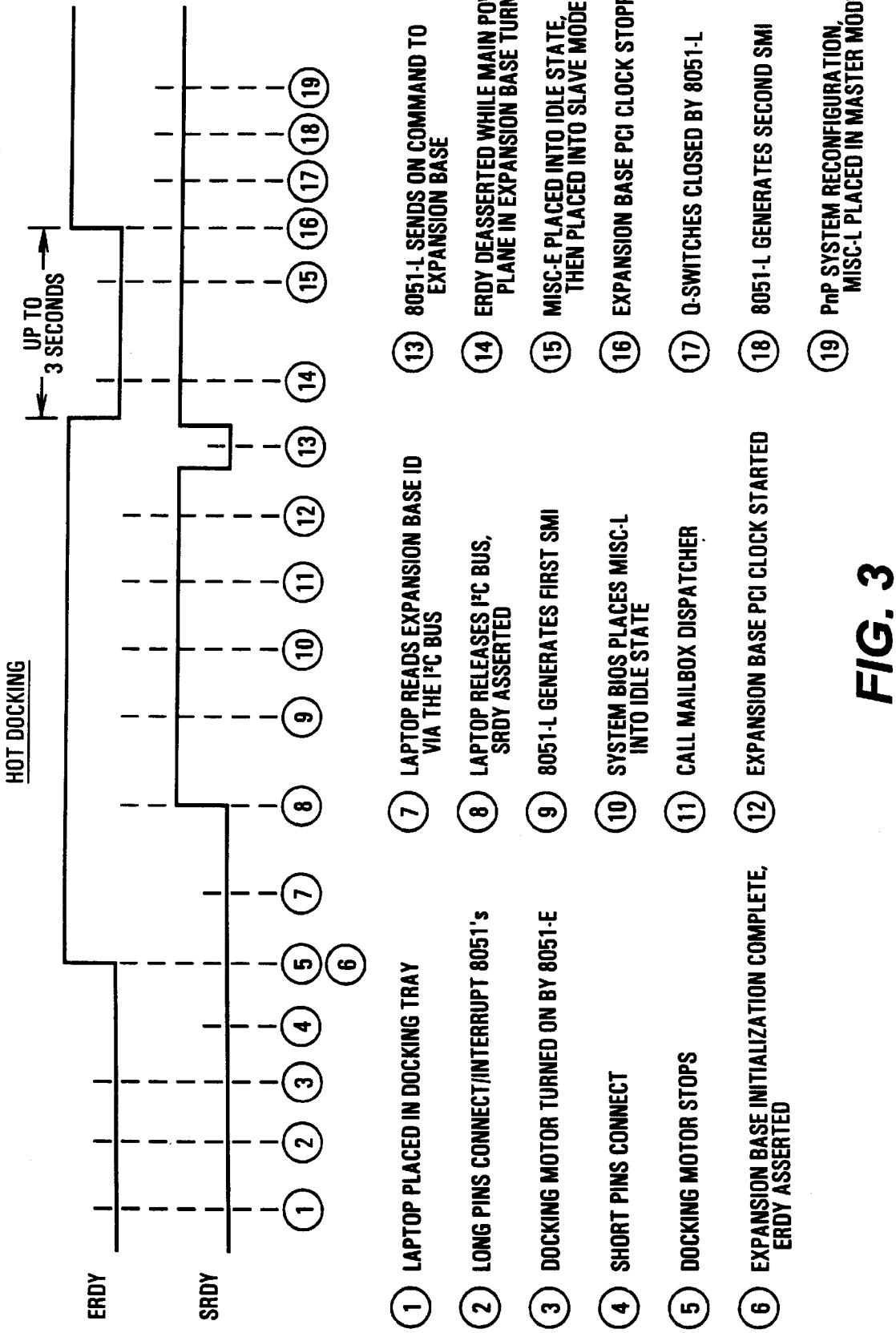
FIG. 3 is a timing diagram illustrating communications between the laptop computer and docking station during a hot docking process according to the present invention.

Referring now to FIG. 3, a timing diagram illustrating exemplary communications between the laptop computer L and the expansion base E during a hot docking process is shown. In particular, the timing diagram demonstrates the handshaking that occurs between the laptop computer L and the expansion base E via the expansion base ready signal ERDY and the system ready signal SRDY during the hot docking process. The handshaking is used to place the local PCI arbiters 194a and 194b into an IDLE mode such that closure of the Quickswitches 113 does not cause a potentially fatal system error. Stated another way, a physical docking occurs followed by logical docking that allows the PCI bus portions 112a and 112b to be safely and quickly unified.

In the disclosed embodiment, the process begins when the laptop computer L is placed in a docking tray (not shown) for hot docking. At step 2, the long pins 147c of FIG. 2 connect, causing the signal EBOXL# to transition from a logic high level to a logic low level. The transition of the signal EBOXL# is recognized as an interrupt by the 8051 microcontrollers 170a and 170b, and indicates that the user desires to dock the laptop computer L. In response, the 8051 microcontroller 170b of the MSIO-E 124b activates the docking motor 117 at step 3 via the I$^2$C bus 149. The docking motor 117 is included in the preferred embodiment to aid in the repeatability and reliability of the docking procedure.

At some point after the docking motor 117 has been turned on, the short pins 147a connect (step 4). When the short pins 147a connect, the signal EBOXS# transitions from a logic high level to a logic low level, informing the 8051 microcontrollers 170a and 170b that all signal lines between the laptop computer L and the expansion base E are now connected. Shortly thereafter at steps 5 and 6, the docking motor 117 is stopped and the expansion base E completes initialization and the MSIO-E 124b asserts the expansion base ready signal ERDY to the 8051 microcontroller 170a of the MSIO-L 124a. Steps undertaken during the initialization process include initializing mask values, hardware mailboxes and various portions of the 8051 microcontroller 170 code. Assertion of the expansion base ready signal ERDY causes the laptop computer L to retrieve expansion base E identification information over the I$^2$C bus 194 at step 7. As mentioned, the information concerning the configuration of the expansion base E is stored in an EEPROM 151 connected to the I$^2$C bus 149b.

The docking process next progresses to step 8 where the laptop computer L releases the I$^2$C bus 149 by asserting the system ready signal SRDY. In the disclosed embodiment, the expansion ready signal ERDY and system ready signal SRDY are used to avoid collisions on the I$^2$C bus 149. When the expansion base ready signal ERDY is at a logic low level, the 8051 microcontroller 170a in the laptop computer L is not allowed to be an I$^2$C bus master. Likewise, when the system ready signal SRDY is deasserted, the 8051 microcontroller 170b in the expansion base E is not allowed to be an I$^2$C bus master. Essentially, these two signals are used as semaphore flags. As an example, when the laptop computer L needs to send a command to the expansion base E over the I²C bus 149, it first deasserts the system ready signal SRDY to avoid any collisions on the I²C bus. Further suppose that the 8051 microcontroller 170a desires to communicate with batteries or fans or other components attached to the I²C bus 149 it first examines the expansion base ready signal ERDY. If the signal ERDY is active (at a logic low level), the 8051 microcontroller 170a recognizes the expansion base E is communicating over the I²C bus 149 and does not interrupt it. The system ready signal SRDY is used in the same manner.

In an ideal I²C bus implementation, this extra level of handshaking is not required and the I²C bus is permitted to have more than one master communicating at the same time. In the disclosed embodiment, however, the signals SRDY and ERDY are used to avoid any potential problems with contention on the I²C bus. Note that the I²C bus 149 is not enabled/disabled by the Quickswitches 133 and that the two portions 149a and 149b are connected by medium length pins 147b as soon as the system is docked.

After the laptop computer L has retrieved expansion base E information via the I²C bus 149, it asserts the system ready signal SRDY and releases the I²C bus. At step 9, the 8051 microcontroller 170a of the MSIO-L 124a generates a first system management interrupt (SMI). An SMI is a non-maskable interrupt having almost the highest priority in the computer system. Only the reset signal R\S* and cash flush signal FLUSH*, which can be conceptualized as interrupts, have a higher priority than the SMI. Details of the system management interrupt and system management mode are well known to those skilled in the art. In the preferred embodiment, the SMA is generated by writing to an 8051-to-system mailbox register (not shown), but could be generated in a number of other ways.

The SMI places the computer system in system management mode, causing an SMI handler routine to be executed. In turn, the SMI handler responds by notifying the system BIOS that the docking state had changed. This is the beginning of the logical portion of the docking process. After receiving the SMI, the BIOS sets memory flags (bits) that are interpreted by the operating system as a docking event. When the system exits system management mode and processor control returns to the operating system, the operating system calls or polls the BIOS to look for changes indicative of a request to dock. A virtual device driver (VxD) can be used by the operating system to poll flags set by system BIOS. Generally, it is desirable for the system to remain in system management mode less than 100 microseconds at a time.

The operating system, which is preferably Windows'95® or another operating system that supports Plug-and-Play, next polls drivers or other running processes to determine if it will accept or reject the hot docking request. If the attempted hot docking is rejected by the operating system, the Quickswitches 113 remain open. If the docking event is accepted, the operating system sends a command to the BIOS instructing it to complete the docking process and close the Quickswitches 113.

Referring now to step 10, either the system BIOS or the MSIO-L 124a places the local PCI arbiter 194a of the MISC-L 118a into an IDLE mode, thereby forcing all PCI bus 112a activity to cease. The MISC 118 arbiters can operate in three modes: master, slave, and idle. These combinations allow support for hot docking and allow the MISC 118 to be used in both the laptop computer L and the expansion base E. As mentioned, both the MISC-L 118a and the MISC-E 118b can be put into IDLE mode during the hot docking sequence. IDLE mode forces all PCI bus 112 activity to cease and causes the bus to be parked at the MISC 118. IDLE mode can be entered from either SLAVE or MASTER mode. IDLE mode can also exit into either SLAVE or MASTER mode. When an Arbiter Idle Request bit (not shown) is set in by the MSIO 124 via the MSB bus 152, the following sequence commences:

1. The top level arbiter (only active in MISC-L 118a) overrides its grant timers and immediately pulls requests to both the master and slave arbiters.

2. The master and slave arbiters function normally and are allowed to complete the minimum grant times for their respective masters.

3. The master and slave arbiters then mask all requests and park themselves on the bus.

4. The master and slave arbiters assert their respective Arbiter Idle Status bits (not shown) which in turn are communicated to the MSIO 124 via the MSB bus 152 to indicate that the PCI bus 112 is idle and ready for hot docking.

When the Arbiter Idle Request bit is cleared following completion of the hot docking, the top level arbiter in the MISC-L 118a negates the Arbiter Idle Status bits and simply grants to the MISC-L 118a. Normal PCI bus 112 activity is then resumed.

It should be noted again that "IDLE mode" and "standby mode" are separate and distinct conditions. In a typical standby mode, the state of she system is stored in system memory, all devices are placed in a low power state if possible, with power being removed from the floppy drive, the hard drive and most ports. Bus clocks are also disabled, although a lower frequency clock often remains active to maintain system memory.

At step 11, the Plug-and-Play BIOS generates a mailbox runtime command used to inform the 8051 microcontroller 170a that it has permission to continue with the docking process. Communication with the 8051 microcontroller 170a is accomplished through system BIOS, which in turn communicates with the 8051 microcontroller 170a code through hardware mailboxes.

After receiving permission, the 8051 microcontroller 170a proceeds, at step 12, to enable the PCI clock in the expansion base E. The 8051 microcontroller 170a of the laptop computer L is configured to control the PCI clock of the expansion base E through a general purpose I/O pin in the MSIO-L 124a. In the disclosed embodiment of the invention, the PCI clock of the expansion base E must be enabled in order to idle the PCI bus 112b.

A variety of methods can be utilized to generate the PCI clock signal in the expansion base E. For example, additional Quickswitches can be provided in the expansion base E to switch the PCI clock between expansion base E sourced clocks and laptop computer L sourced clocks. In the alternative, a clock generator chip can be utilized to generate expansion base E PCI clocks synchronized to an internal oscillating source or to the laptop computer L supplied PCI clock. The expansion PCI clock is preferably a 33 MHz clock signal utilized by various components of the expansion base E, including the MISC-E 118b.

In the preferred embodiment, two power planes are included within the expansion base E. A first power plane VCC1 provides power to a real time clock (RTC) in the MSIO-L 124b. In addition to maintaining the RTC, this power plane VCC1 is utilized to ensure that CMOS memory contents are not erased. The first power plane VCC1 is also used to power the flash ROM 126, the I²C interfice 174b, the docking motor 117, and the 8051 microcontroller 170b in the expansion base E. Very little power is dissipated through this power plane. If the expansion base E is unplugged from a wall outlet, however, power to VCC1 is lost. A second, main power plane VCC2 is used to power the remaining components of the expansion base E as well as the laptop computer L when it is docked.

In step 13, the 8051 microcontroller 170a sends an "on" command to the expansion base E instructing it to turn on its main power plane VCC2. The system ready signal SRDY is deasserted during this communication in order to preempt other uses of the I²C bus 149. After the on command has been sent, control proceeds to step 14 where the MSIO-E 124b deasserts the expansion base ready signal ERDY while the main power plane VCC2 in the expansion base E is being enabled. The main power supply of the expansion base E is preferably similar to that of a conventional desk top computer power supply. The process of enabling this power supply may consume a maximum of approximately three seconds, but typically requires around 500 ms in the disclosed embodiment.

After the power supply output has settled a quiescent state, it asserts a POWERGOOD signal (not shown) to inform the system that the main power supply plane VCC2 is enabled. It should be noted that the main power supply plane VCC2 is not required in order to operate the docking motor 117 and PCI clock. Also, the power supply of the expansion base E is generally disabled when the laptop computer L is undocked.

At step 15, after the main power plane VCC2 in the expansion base E has been turned on, the MISC-E 118b is placed into an IDLE mode followed by a transition into SLAVE mode. The MISC-E 118b is placed in slave mode so that it is in a known state in the event that an error occurs during the docking process. The 8051 microcontroller 170b uses the MSB serial bus 152 to idle the local PCI arbiter 194b of the MSC-E 118b.

At step 16, the 8051 microcontroller 170b clock disables its own clock in order to relinquish control of its associated flash ROM 126 to the system BIOS as described above. System BIOS is thereafter able to control the clock to the 8051 microcontroller 170b. The expansion base ready signal ERDY is also asserted at step 16. All PCI clock signals in the expansion base E are at a logic low level at this point. Assertion of the expansion base ready signal ERDY signifies the expansion base E is in a proper condition for safe closure of the Quickswitches 113.

At step 17, the MSIO-L 124a asserts a control signal CONTROL to the Quickswitches 113. The Quickswitches 113 are then closed, functionally connecting the two portions 112a and 112b of the PCI bus. After the Quickswitches 113 are closed, the 8051 microcontroller 170a generates a second SMI (step 18) that informs the system BIOS that the Quickswitches 113 are closed. The operating system is now capable of communicating to devices connected to the PCI bus 112b in the expansion base E. The laptop computer L can now program the various controllers of the expansion base E, and system BIOS can communicate with all devices on the PCI bus 112 for purposes of Plug-and-Play configuration.

At step 19, the MISC-L 118a local arbiter is placed in the MASTER mode. PCI Plug-and-Play and ISA Plug-and-Play system reconfiguration is then carried out so that all system resources may be properly utilized. During the reconfiguration, all Plug-and-Play cards are first isolated and assigned an identification code. Resource data is then read from each installed card. Based on the resource data, computer system resources are arbitrated for each Plug-and-Play card, following which each identified card is configured and activated. Device drivers for the cards are also loaded.

Figure 4:
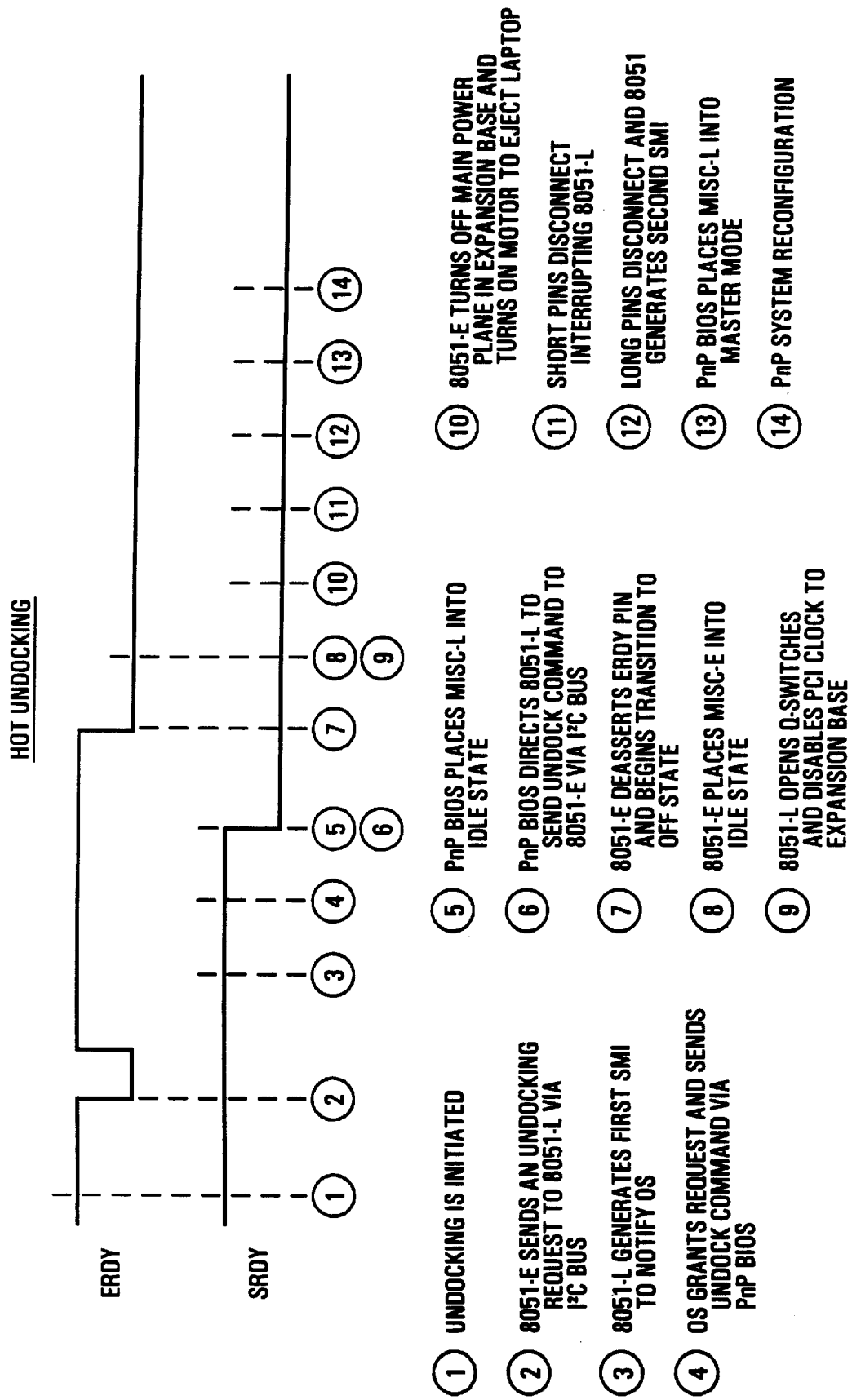
FIG. 4 is a timing diagram illustrating communications between the laptop computer and docking station during a hot undocking process according to the present invention.

Referring now to FIG. 4, a timing diagram illustrating exemplary communications between the laptop computer L and the expansion base E during a hot undocking process is shown. The handshaking is used to place the local PCI arbiters 194a and 194b into an IDLE mode so that an opening of the Quickswitches 113 does not cause cycles to be lost over the PCI bus 112.

In the disclosed embodiment, undocking is initiated at step 1 by either pressing an undocking button/eject switch or through a Plug-and-Play compliant operating system by clicking an undock menu button. If undocking is initiated by software, steps 2 and 3 are not necessary. At step 2, the 8051 microcontroller 170b sends an undock request to the 8051 microcontroller 170a via the I²C bus 149. The signal ERDY is pulsed low at this point to preempt other uses of the I²C bus 149. The 8051 microcontroller 170a then responds at step 3 by generating a first SMI notifying the operating system that the user would like to undock. At step 4, if the operating system grants the request, it sends an undock command, via the system BIOS, to eject the laptop computer L after current cycles have completed and nothing else is running under SMI.

At step 5, either the system BIOS Plug-and-Play code or the 8051 microcontroller 170a places the local arbiter 194a of the MISC-L 118a into an IDLE mode. Once in idle, the MISC-L 118a parks itself on the PCI bus 112a. The system BIOS, at step 6, then directs the 8051 microcontroller 170a to send an undock command to the 8051 microcontroller 170b of the expansion base E via the I²C bus 149. Following this undock command, the 8051 microcontroller 170a deasserts the system ready signal SRDY. At step 7, the 8051 microcontroller 170b deasserts the expansion base ready signal ERDY and begins a transition to the off state.

The expansion base transition to the off state begins at step 8 where the 8051 microcontroller 170b places the local arbiter 194b of the MISC-E 118b into an IDLE state. Both local PCI arbiters 194a and 194b are now idled and the PCI bus 112 is sufficiently quiet for undocking to progress. In the disclosed embodiment, it is necessary to leave the PCI clock generator in the expansion base E running until after the local arbiter 194b in the MISC-E 118b has been idled. Shortly thereafter at step 9, the 8051 microcontroller 170a causes the Quickswitches 113 to be opened via a control signal CONTROL from general purpose I/O circuitry 172a in the MSIO-L 124a. At approximately the same time (step 10), the 8051 microcontroller 170b disables the main power supply plane in the expansion base E and activates the docking motor 117 to eject the laptop.

At this point, motorized undocking has begun and the short pins 147a of the expansion connector 146 are the first to disconnect at step 11. This causes a rising edge on the signal EBOXS#. The signal EBOXS# can be used as a safety mechanism to alert the laptop computer L (particularly the 8051 microcontroller 170a) when the automated software undocking procedures have been bypassed. For instance, in the disclosed embodiment, the EBOXS# signal initiates the appropriate undocking software even if that signal is the first indication that an undocking event is underway. After the short pins 147a have been disconnected, approximately one millisecond passes before the medium length signal pins 147b disconnect.

Next, the long pins 147c disconnect at step 12 causing the signal EBOXL# to transition from logic low to a logic high level. This transition notifies both 8051 microcontrollers 170a and 170b that all medium length signal pins 147b have been fully disconnected. As part of this step, the 8051 microcontroller 170a generates a second SMI to notify Plug-and-Play code of completion of the physical undocking process. In response, the Plug-and-Play code responds by placing the local arbiter 194a of the MISC-L 118a into MASTER mode at step 13. Lastly, PCI Plug-and-Play and/or ISA Plug-and-Play system reconfiguration is then carried out so that system resources of the expansion base E are no longer recognized by the laptop.

Figure 5A:
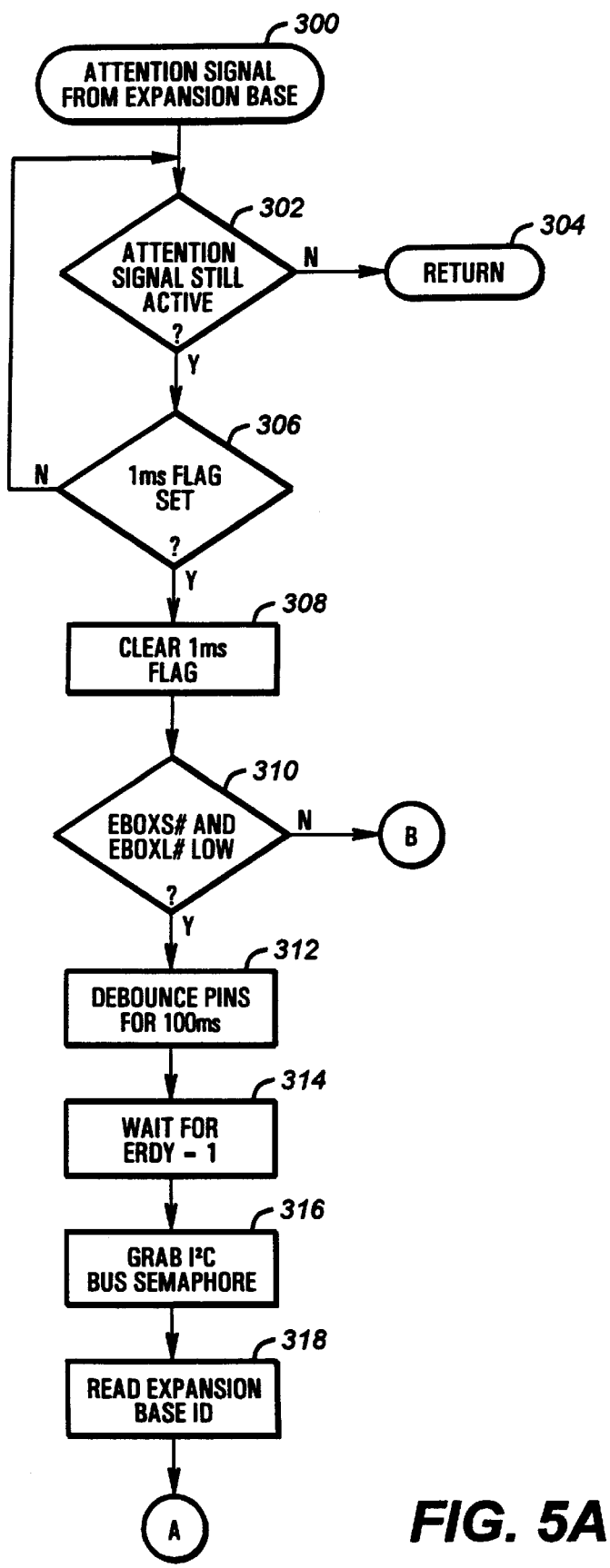
FIGS. 5a–5c and FIGS. 6a–6c are flowchart diagrams of exemplary microcontroller code executed in the laptop computer during hot docking and hot undocking events.
Figure 5B:
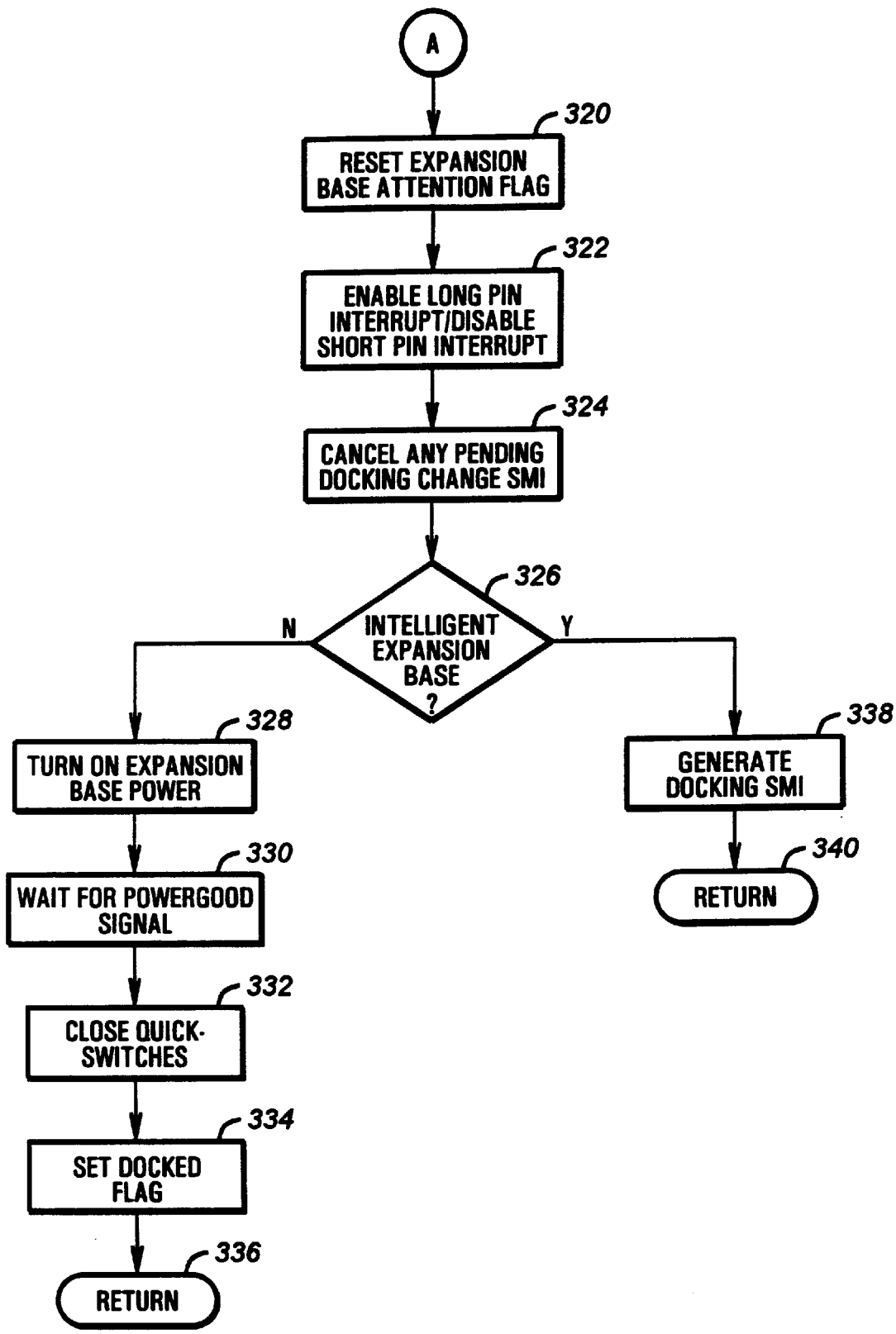
Figure 5C:
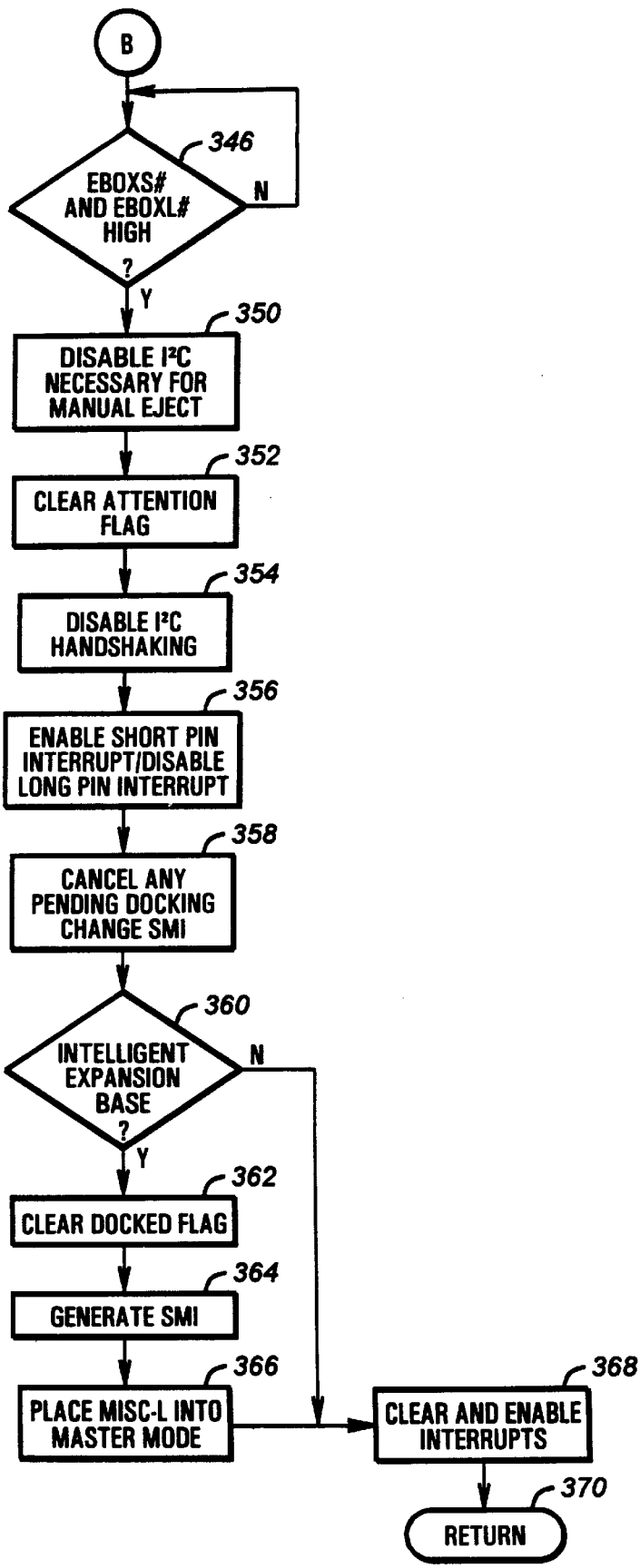

Referring now to FIG. 5a, FIG. 5b and FIG. 5c, flowchart diagrams are shown for microcontroller code executed by the laptop computer L during hot docking and hot undocking events. This code is similar to and operates in conjunction with that of the microcontroller of the expansion base E. The latter code receives commands for accomplishing tasks such as activating the docking motor 117 and is not shown for sake of clarity.

Execution of the microprocessor code is initiated following an attention signal from the expansion base at step 300. Control proceeds to step 302 where the attention signal flag is polled to determine if it is still active. The attention signal is generated by the short and long pins 147a and 147c of the expansion connector 146. If the attention signal is not active, indicative of a spurious request, the routine is exited at step 304. If the attention signal is still active as determined in step 302, control passes to step 306 to determine if a one millisecond flag is set. A one millisecond delay period, initiated upon entry into the code at step 300, is used to further filter spurious requests. If the delay period is not finished and the one millisecond flag is not set as determined at step 306, control returns to step 302. If the one millisecond period has passed, control proceeds to step 308 and the one millisecond flag is cleared.

Control next proceeds to step 310 where the signals EBOXS# and EBOXL# are examined. If both signals are low, indicating that the short and long pins 147a and 147c are connected, control proceeds to step 312 for a debounce period of one hundred milliseconds. Note that the docking motor 117 has preferably been turned on at this point by microcontroller code executing in the expansion base E. Following the debounce period, control proceeds to step 314 and the laptop computer L waits for the expansion base ready signal ERDY to transition to a logic high level. In the disclosed embodiment, the signal ERDY must transition within two-hundred fifty milliseconds or a timeout occurs and a return is made to the main microcontroller routine.

After the signal ERDY has transitioned to a logic high level, control proceeds to step 316 and the 8051 microcontroller 170a takes command of the I²C bus 149. Control proceeds to step 318 where expansion base identification information is retrieved over the I²C bus 149. Control then passes to step 320 (FIG. 5b) and the expansion base attention flag is reset. Next, the long pin 147c interrupt is enabled while the short pin 147a interrupt is disabled at step 322. Control proceeds to step 324 and any pending docking change SMI's are cancelled.

Control next passes to step 326 for a determination of the processing capabilities of the expansion base E. If the expansion base E does not incorporate capabilities such as those described in conjunction with FIG. 2, control proceeds to step 328 and a command is sent to turn on power in the expansion base E. Control then passes to step 330 for a waiting period until a power good signal is received from the expansion base E. Control next passes to step 332 where the Quickswitches 113 are closed, functionally coupling the shared portions of the PCI bus 112. A docking flag is then set in step 334 before a return is made to the main microcontroller routine in step 336.

If the expansion base E incorporates processing capabilities such as those described in FIG. 2, control proceeds from step 326 to step 338 and a docking SMI is generated. As mentioned above, this SNU is used to provide the operating system with a chance to accept or reject the hot docking request. Control then proceeds to step 340 where a return is made to the main microcontroller routine.

If the signals EBOXS# and EBOXL# are at a logic high level as determined in step 310, control passed to step 346 (FIG. 5c). A determination that both signals EBOXS# and EBOXL# are at a logic high level indicates that the short and long pins 147a and 147b are disconnected and that an attempt has been made to remove the laptop computer L from the expansion base E without following proper undocking procedures. At step 346, the signals EBOXS# and EBOXL# are again examined to determine if they are at a logic high level. If not, control remains with step 346 for continued polling of these signals. If the signals EBOXS# and EBOXL# are determined to be at a logic high level, control passes to step 350 for execution of a debounce period (waiting period) if necessary for a manual eject. Control then passes to step 352 and the attention flag from the expansion base E is cleared.

Control next proceeds to step 354 where I²C bus 149 handshaking is disabled. Control then passes to step 356 where the short pin 147a interrupt is enabled while the long pin 147c interrupt C is disabled. Any pending docking change SMI's are then cancelled at step 358. Control proceeds to step 360 for a determination of the processing capabilities and configuration of the expansion base E. If the expansion base E has capabilities such as those described in conjunction with FIG. 2, control proceeds to step 362 and the docked flag is cleared. Control then proceeds to step 364 and an SMI is generated to allow the operating system to execute Plug-and-Play reconfiguration such that the capabilities of the expansion base E are no longer recognized by the laptop computer L. Control then proceeds to step 366 and the local PCI arbiter 194a of the MISC-L 118a is placed in MASTER mode.

Control next proceeds to step 368, which is also where control proceeds if the expansion base E lacks sufficient processing capabilities as determined in step 360. In step 368, the hot docking and hot undocking interrupts are cleared and enabled before a return is made to the main microcontroller routine in step 370.

Figure 6A:
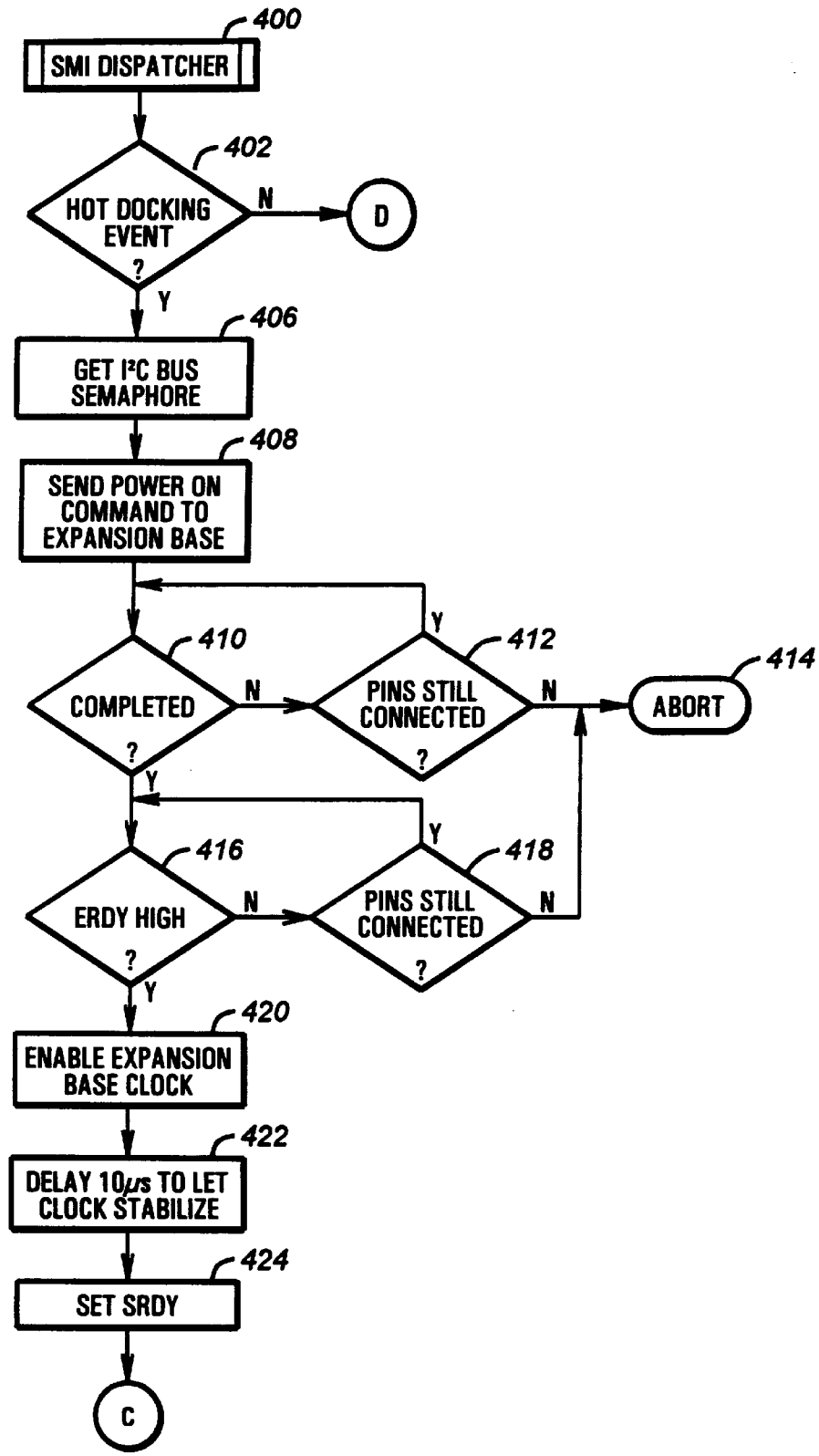

Referring now to FIG. 6a, details of an exemplary SMI dispatcher routine 400 are provided. This routine can be called following step 338 of FIG. 5b. Control first proceeds to step 302 for a determination if a hot docking or a hot undocking event is occurring. If the attention signal from the expansion base E has been generated as a result of a hot docking event, control proceeds to step 406 where the laptop computer L assumes control of the I²C bus 149. Control then passes to step 408 and a power on command is sent to the expansion base E via the I²C bus 149. Control then passes to step 410 and a polling loop begins to determine if power has been enabled in the expansion base E. If not, control proceeds to step 412 for a determination if the pins 147 of the expansion connector 146 are still connected. If the pins 147 are connected, control returns to step 410. If the pins 147 are not connected, control proceeds to step 414 where handshaking is cancelled and the I²C bus 149 is released.

Following enablement of power in the expansion base E, control proceeds to step 416 where the expansion base ready signal ERDY is examined. If the signal ERDY is at a logic low level, indicating that the expansion base E is not ready for completion of the hot docking process, control proceeds to step 418. In step 418, the pins of the expansion base connector 146 are again examined to determine if they are connected. If not, handshaking is cancelled and the I²C bus is released. If the pins are connected, control returns to step 416. Following a transition of the expansion base ready signal ERDY to a logic low level, control proceeds to step 420 where the expansion base E PCI clock is enabled.

Figure 6B:
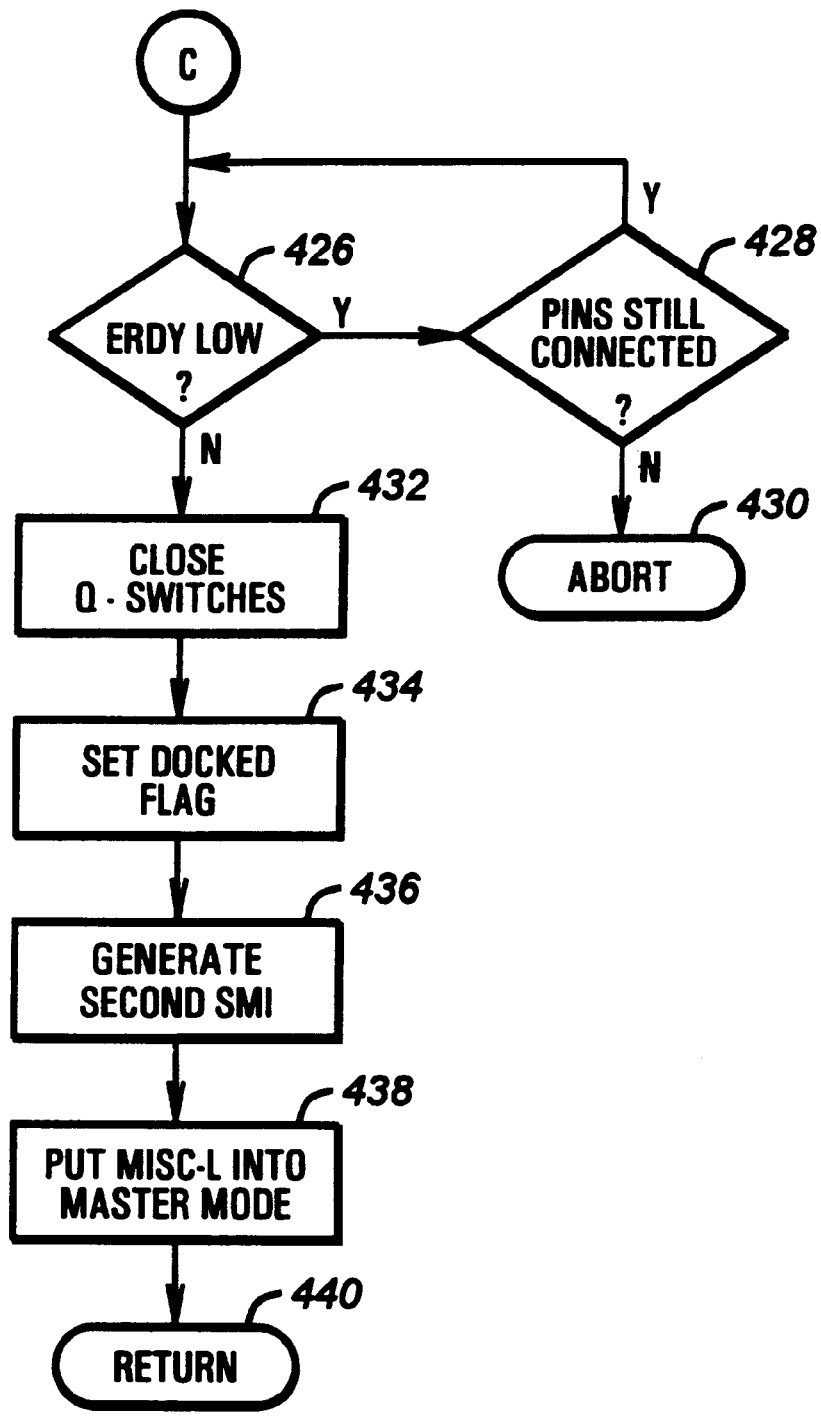

Control then passes to step 422 for a delay of ten microseconds to enable the expansion base E PCI clock to stabilize. Control proceeds to step 424 where the laptop computer L ready signal SRDY is asserted. Control then proceeds to step 426 (FIG. 6b) and the expansion base ready signal ERDY is again examined. If this signal is at a logic low level, control proceeds to step 428 to determine of the pins of the expansion base connector 146 are still connected. If so, control returns to step 426. If not, control proceeds step 430 and handshaking is aborted. When the signal ERDY transitions to logic high level as determined in step 426, control proceeds to step 432 for closure of the Quickswitches 113. Control then passes to step 434 and the docked flag is set. A second SMI is then generated at step 436, allowing Plug-and-Play reconfiguration to be accomplished. Control then passes to step 438 where the local PCI arbiter 194a of the MISC-L 118a is placed into master mode. Finally, a return is made to the main microcontroller routine in step 440.

Figure 6C:
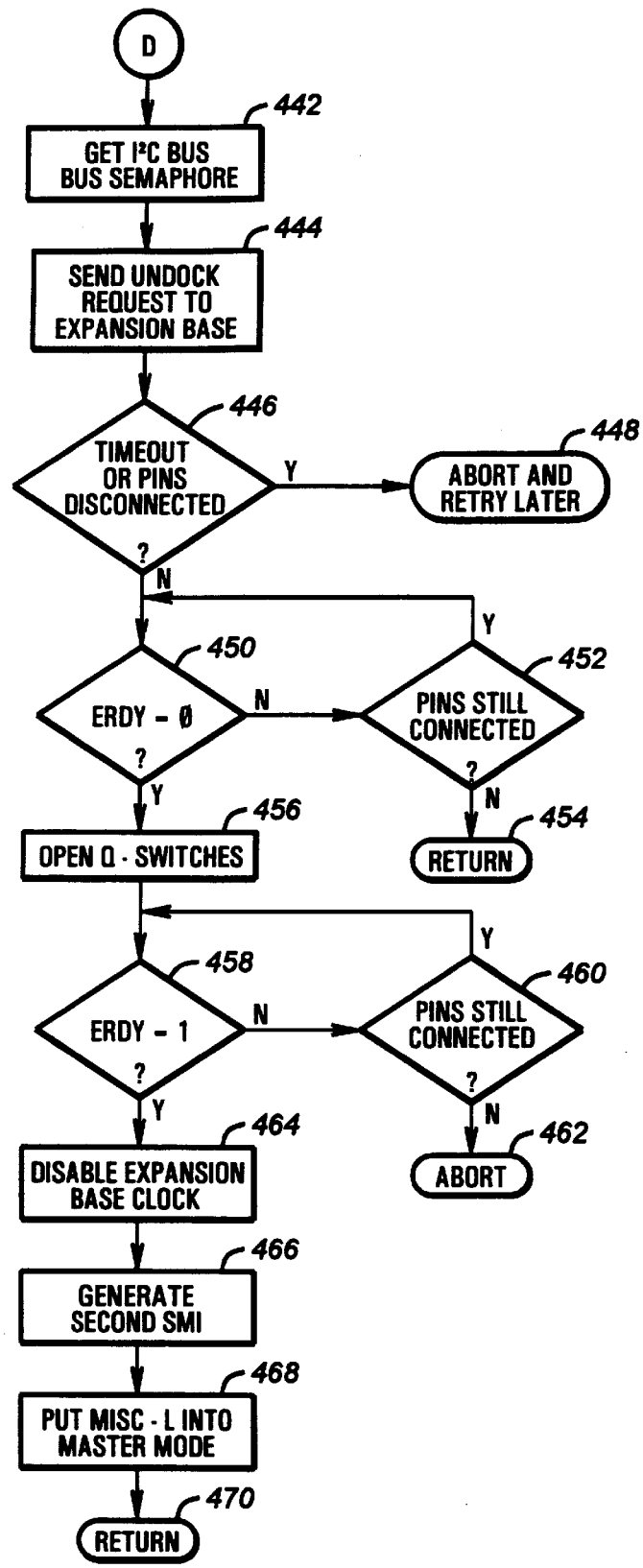

If the attention signal from the expansion base E indicates a hot undocking event as determined in step 402, control proceeds to step 442 of FIG. 6c and control of the I²C bus 149 is procured by the laptop computer L. Control then passes to step 444 and an undock request is sent to the expansion base E via the I²C bus 149. Control proceeds to step 446 to determine of the pins of the expansion connector 146 are connected or if a timeout has occurred. If either the pins 147 are disconnected or a timeout event has occurred, the undocking procedure is aborted at step 448 for retry at a later time. Otherwise, control proceeds to step 450 for examination of the expansion base ready signal ERDY. If the signal ERDY is at a logic high level, control proceeds to step 452 and the connection status of the pins 147 of the expansion connector 146 are again examined. If the pins 147 are still connected, control returns to step 450. If the pins 147 are no longer connected, control proceeds to step 454 where handshaking is cancelled and the I²C bus 149 is released.

The expansion base E ready signal ERDY is at a logic high level as determined in step 450, control proceeds to step 456 and the Quickswitches 113 are opened. Control next proceeds to step 458 where the signal ERDY is again examined. If the signal ERDY is at a logic low level, control proceeds to step 460 to determine if the pins 147 of the expansion connector are still connected. If so, control returns to step 458. If the pins 147 are disconnected, the undocking procedure is aborted at step 462.

If the signal ERDY is asserted as determined in step 458, control proceeds to step 464 where the expansion base E clock is disabled. Control next proceeds to step 466 and a second SMI is generated. This SMI allows the laptop computer L to conduct Plug-and-Play reconfiguration such that resources of the expansion base E are no longer recognized. Control then proceeds to step 468 where the local PCI arbiter 194a of the MISC-L 118a is placed into master mode so that normal operation of the laptop computer L can be resumed. Finally, in step 470 a return is made to the main microcontroller routine.

Figure 7:
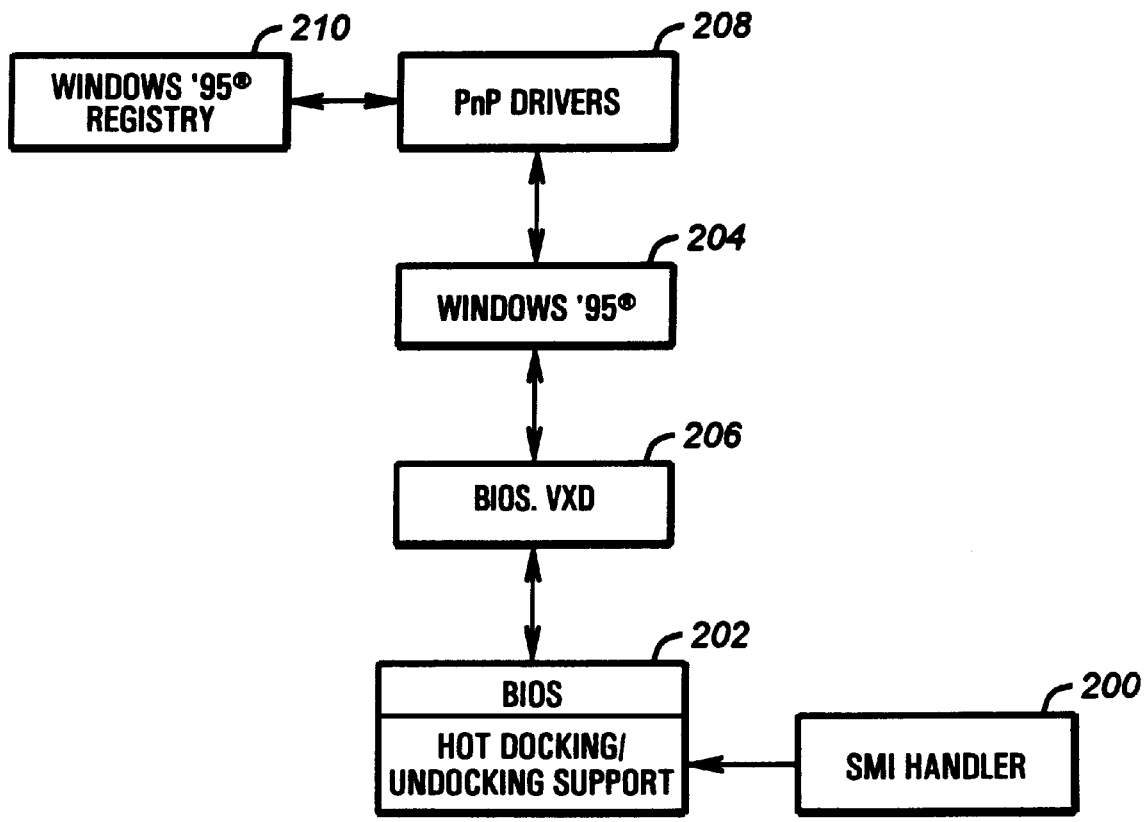
FIG. 7 is a block level diagram of system software components configured to support hot docking/undocking.

Referring now to FIG. 7, a block level diagram of system software components configured to support hot undocking/undocking is shown. As mentioned above, the SMI handler 200 is used to notifying the system BIOS 202 that the docking state had changed. In the preferred embodiment, the system BIOS 202 incorporates hot docking/undocking support features including Plug-and-Play capabilities. The system BIOS 202 sets memory flags that are interpreted by Windows '95® 204 as a docking event.

When the laptop computer L exits system management mode and processor control returns to the Windows '95®, the operating system calls or polls the system BIOS 202 to look for changes indicative of a request to dock. An advance power management (APM) driver or virtual device driver BIOS. VxD 206 can be used by the operating system to poll flags set by system BIOS. The BIOS. VxD 206 is configured to support communications between Windows '95® 204 and the system BIOS 202. After a system reconfiguration following a hot docking/undocking event, Plug-and-Play drivers 208 for system components are registered or deleted from the Windows '95® Registry as appropriate.

Many alternate embodiments of the present invention are contemplated. It is not necessary, for instance, that the expansion base E incorporate motorized docking/undocking capabilities. Extra debouncing may be required for long and short pin docking signals in such expansion bases. Such a system could allow the user to simply pull the laptop from the expansion base without first doing anything else. The short pins would cause the initiation of the undocking software, all transparent to the user.

Expansion bases of varying intelligence can also be used. For example, the expansion base may not incorporate an 8051 microcontroller capable of communications via the I²C bus. In this case, simplified hardware handshaking can be utilized to place the connecting bus into an idle state. In expansion bases having reduced handshaking and bus mastering capabilities, it may only be necessary to make sure that the power in the expansion base is on before the Quickswitches are closed. In this embodiment, the expansion base ready signal ERDY can be driven by a signal POWERGOOD (not shown) from the power supply. The laptop computer L can thereby determine if the expansion base is unplugged, in which case it will not close the Quickswitches.

Of note in all of the disclosed and contemplated embodiments is that the expansion base PCI bus be in an idled state prior to the docking event. In addition, some method is preferably incorporated for notifying the operating system that a docking event is occurring. The operating system preferably includes the ability to accept or reject the docking event and also provides Plug-and-Play support.

Thus, a method and circuitry has been described for allowing the operating system, firmware, system BIOS, microcontrollers, and installed system hardware to cooperate in a manner that allows for efficient hot docking/undocking. The laptop computer and expansion base are connected by a shared PCI bus and low on-resistance switches. Pins of differing lengths are used to provide docking and undocking status information. The buses are placed in a quiescent, idled state prior to a docking or undocking event—bypassing the need to go into standby mode. The invention thereby provides a faster and more user-friendly way of inserting and removing a laptop computer from a expansion base.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claim is:

1. A computer system incorporating hot docking and undocking capabilities, the computer system comprising:

a first input/output bus portion;

an expansion connector to physically couple the first input/output bus portion to a second input/output portion in an expansion base; and a local arbiter coupled to the first input/output bus portion to issue bus requests from devices coupled to the first input/output bus portion, wherein said local arbiter is capable of being placed in an idle state in which said local arbiter is parked on said first input/output bus portion prior to docking and undocking events.

2. The computer system of claim 1, further comprising:

circuitry configured to place said local arbiter in the idle state prior to docking and undocking events.

3. The computer system of claim 1, further comprising:

circuitry coupled to said local arbiter and configured to control a clock associated with said first input/output bus portion.

4. The computer system of claim 1, further comprising:

system basic input/output services (BIOS) code in a memory coupled to said first input/output bus portion to place said local arbiter in the idle state prior to docking and undocking events.

5. The computer system of claim 1, further comprising:

a plurality of bus switches coupled to said expansion connector and to said first input/output portion to couple said first input/output bus portion to the second input/output bus portion.

6. An expansion base incorporating hot docking and undocking capabilities, the expansion base comprising:

a first input/output bus portion;

an expansion connector to physically couple the first input/output bus portion to a second input/output portion in an expansion base; and a local arbiter coupled to the first input/output bus portion to issue bus requests from devices coupled to the first input/output bus portion, wherein said local arbiter is capable of being placed in an idle state in which said local arbiter is parked on said first input/output bus portion prior to docking and undocking events.

7. The expansion base of claim 6, further comprising:

circuitry configured to place said local arbiter in the idle state prior to docking and undocking events.

8. The expansion base of claim 6, further comprising:

circuitry coupled to said local arbiter and configured to control a clock associated with said first input/output bus portion.

9. The expansion base of claim 6, further comprising:

system basic input/output services (BIOS) code in a memory coupled to said first input/output bus portion to place said local arbiter in the idle state prior to docking and undocking events.

10. The expansion base of claim 6, further comprising:

a plurality of bus switches coupled to said expansion connector and to said first input/output portion to couple said first input/output bus portion to the second input/output bus portion.

* * * * *